Figure 1:
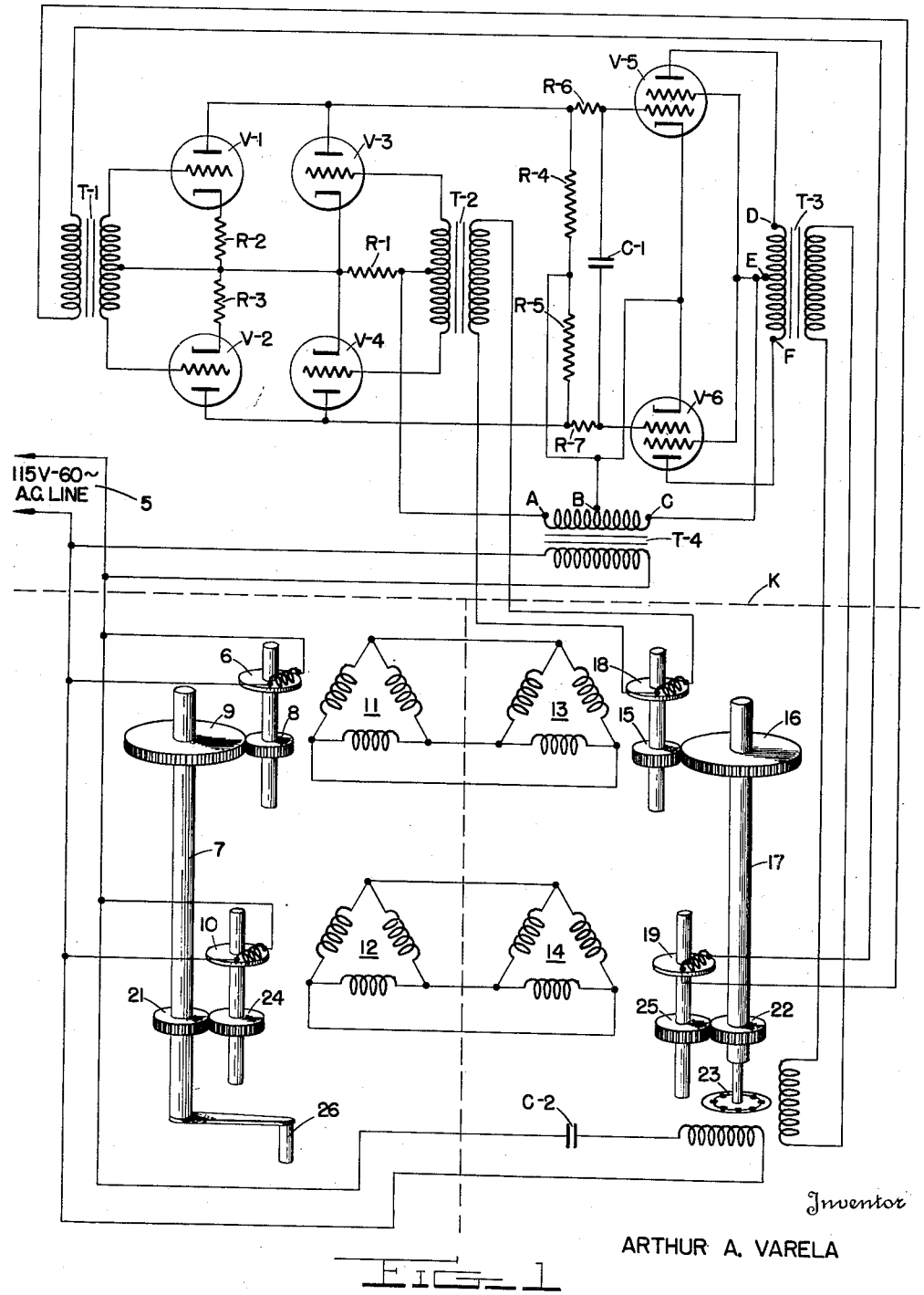

ARTHUR A. VARELA

June 8, 1954     A. A. VARELA     2,680,828
ELECTRICAL POSITION CONTROL SYSTEM
Filed March 18, 1946     3 Sheets-Sheet 2
1 SUPPLY LINE VOLTAGE 
2 PLATE VOLTAGE ON V-1 TO V-6 
3 TRANSFORMER ROTORS WHEN LEADING 
4 GRID V-1 & V-3 FOR LEAD 
5 GRID V-2 & V-4 FOR LEAD 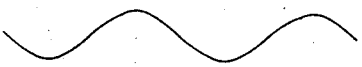
6 TRANSFORMER ROTORS WHEN LAGGING 
7 GRID V-1 & V-3 FOR LAG 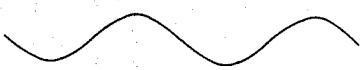
8 GRID V-2 & V-4 FOR LAG 
9 GRID V-5 FOR LEAD
  GRID V-6 FOR LAG 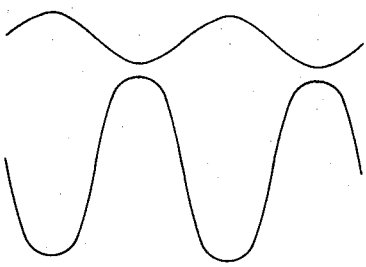
FIG. 2
Inventor
ARTHUR A. VARELA
By M. C. Hayes
Attorney

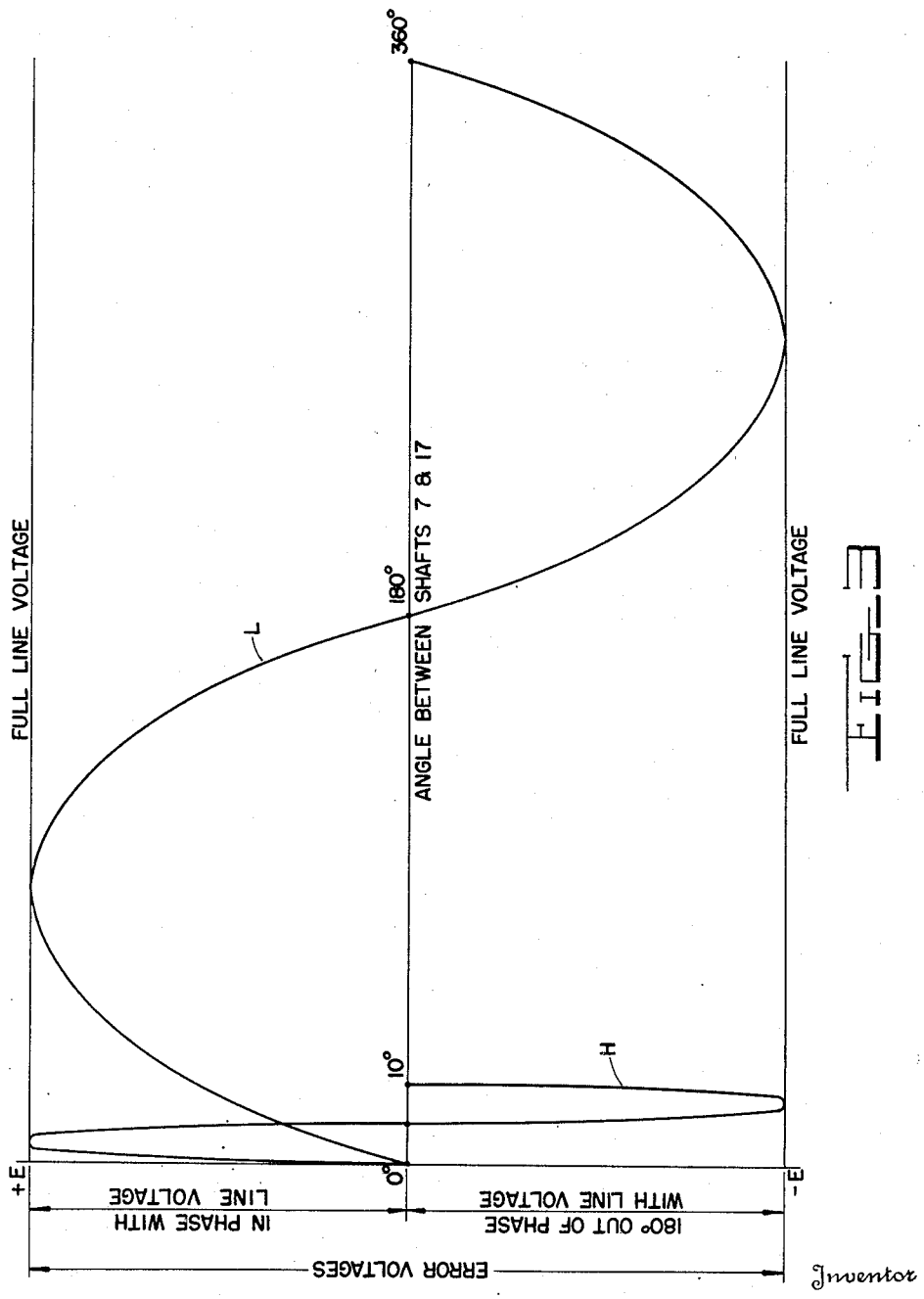

Patented June 8, 1954

2,680,828

UNITED STATES PATENT OFFICE 2,680,828

ELECTRICAL POSITION CONTROL SYSTEM

Arthur A. Varela, Washington, D. C.

Application March 18, 1946, Serial No. 655,359

6 Claims. (Cl. 318—30)

(Granted under Title 35, U. S. Code (1952), sec. 266)

This invention relates in general to a system for producing synchronous angular motion between two or more rotatable shafts, and in particular to a novel electrical means for automatically rendering rapid and accurate corrections to miscorrespondence in the angular relationships of such shafts.

The production of synchronous angular motion between a pair or more rotatable shafts, by means of a pair of self synchronous motors arranged so that the angular movement of the rotor of one motor, ordinarily called the transmitter, of the pair causes a similar angular movement of the rotor of the other motor, ordinarily called the receiver, of the pair is well known to the art. Due, however, to variations in loading on the receiver and to frictional and inertia losses thereof, absolute or even satisfactory synchronism cannot be obtained by this method. Synchronous angular motion capable of driving a load can be produced by the use of an A. C. synchronous transmitter and an A. C. synchronous transformer. Each has a three phase stator winding connected together as would be self synchronous motors. Each also has a single phase rotor winding. The transmitter rotor is geared to the shaft controlling the angular motion and excited by an A. C. line such as the ordinary 110 v. 60 cycle line. Voltages are induced in the transformer rotor, which is geared to the load shaft and a low inertia motor. These induced voltages are indicative of the miscorrespondence of the angular relationship of the rotors and are applied to an electronic circuit making them suitable to drive the motor, which turns this rotor and load shaft to a synchronous position.

Angular correspondence can be maintained within a closer tolerance if the transmitter and the transformer rotors are geared so as to complete a number of revolutions for each revolution of the rotatable shafts. But in this arrangement the rotors produce apparent synchronism for a number of incorrect positions; for example, if the gear ratio were 36:1, the rotors would be in the same relative position 36 times during one revolution of the shafts and hence might synchronize in any one of thirty-six positions, only one of which would be correct. A one to one ratio system can be relied upon to maintain synchronism with a margin of error less than one-half the angular distance between points of ambiguous synchronism as produced by a high ratio system of the order of the above example. It is apparent, then, that it would be desirable to operate a system employing both high and low ratio A. C. synchronous transmitter and transformer units on a time sharing or other cooperative basis.

It is an object of this invention to provide means for producing synchronous motion between two or more rotatable shafts using high and low ratio A. C. synchronous transmitter and transformer units.

It is another object of this invention to provide means for producing synchronous motion between two or more rotatable shafts using high and low ratio A. C. synchronous transmitter and transformer units converting the advantages of each to promote accuracy and eliminate ambiguity.

It is another object of this invention to provide means for producing synchronous motion between two or more rotatable shafts using high and low ratio A. C. synchronous transmitter and transformer units and electronic means converting the advantages of each to promote accuracy and eliminate ambiguity.

It is another object of this invention to provide electronic means in a system for producing synchronous motion between two or more rotatable shafts using high and low ratio A. C. synchronous transmitter and transformer units for selecting which A. C. synchronous unit will have control.

It is another object of this invention to provide electronic means in a system for producing synchronous motion between two or more rotatable shafts using high and low ratio A. C. synchronous transmitter and transformer units for selecting which A. C. synchronous unit will have control and converting the advantages of each to promote accuracy and eliminate ambiguity.

Other objects and features of novelty of the invention will be made apparent by the following description and the annexed drawings, it being understood that such description and drawings are merely illustrative of the invention and impose no limitations thereon.

In the drawings, Fig. 1 is a schematic diagram of one embodiment of this invention. Figures 2 and 3 are waveforms useful in explaining the operation of the circuit in Fig. 1.

Briefly, the system provided by this invention comprises two A. C. synchronous transmitter and transformer units and an electronic circuit to mix the outputs of these transformers and deliver power to a mechanical means for restoring and maintaining synchronism. The rotors of one synchronous unit rotate with the same speed and the other an integral number of times the speed of the controlled and controlling devices.

Referring now in particular to Fig. 1 in the drawings. The stators of the two A. C. synchronous transmitters are shown at 11 and 12 respectively. These are electrically joined by delta connection to the stators of the two A. C. synchronous transformers shown at 13 and 14 respectively. The rotor 6 of the upper transmitter is rotated by gears, 8 and 9, thirty-six times for each revolution of shaft 7. Similarly, the rotor 18 of the upper transformer is rotated by gears 15 and 16, thirty-six times for each revolution of shaft 17. The rotor 10 of the lower transmitter is rotated by gears 24 and 21, at the same speed as shaft 7. Similarly, the rotor 19 of the lower transformer is rotated by gears 22 and 25, at the same speed as shaft 17. The transmitter rotors 6 and 10 are excited by a 115 volt 60 cycle line indicated at 5. This line also energizes transformer T–4 which supplies power to the mixer circuit shown above the horizontal broken line K. The common supply line 5 and the three connections between the stators of each unit are the only connections between the controlling shaft 7 and the driven or load shaft 17. Shaft 7 is shown terminated at one end by a hand crank 26 indicating that the reference torque is applied to this shaft. When there is misalignment between transmitter rotors and transformer rotors, voltages proportional to the error will be induced in the transformer rotors 18 and 19 as described below in reference to Fig. 3. These voltages, hereinafter referred to as error signals, energize the mixer circuit shown above the dotted line K to produce voltages at transformer T–3 which, when fed to the low inertia induction motor shown at 23, cause the same to revolve shaft 17 and rotors 18 and 19 into alignment with shaft 7 and rotors 8 and 10 respectively.

In Fig. 1 the electronic mixing circuit is a raw A. C. circuit which comprises three pairs of push-pull type amplifying tubes V–1 and V–2, V–3 and V–4, and V–5 and V–6, respectively. The first pair V–1 and V–2, have their grids driven in opposite phase by means of transformer T–1, the primary winding of which is connected so as to receive an error voltage generated at the rotor winding 19 of the low speed synchronous transformer 14. The second pair V–3 and V–4, which are connected in parallel with the first pair, have their grids driven in opposite phase by means of transformer T–2, the primary winding of which is connected so as to receive an error voltage generated at the rotor winding 18 of the high speed synchronous transformer 13. Plate voltage for the first and second pairs of tubes is obtained from tap B on the secondary winding of transformer T–4 through coupling resistances R–4 and R–5. Ground connection for these tubes is taken at tap A of this transformer.

As is characteristic of a synchronous motor combination such as that herein described the phase of the rotor error voltage produced in the synchronous transformer 13 and 14 depends on the sense of the angular displacement of the transformer rotor with respect to the transmitter rotor, and the magnitude of the error varies substantially as the sine of the angle of displacement. For example, angular displacement from 0 to 180° produces an error voltage, in the transformer rotor having the same phase as the transmitter rotor voltage, while angular displacements between 180° and 360° produces an error voltage in the transformer rotor of opposite phase. It will thus be recognized that since the phase of the A. C. plate supply voltage for tubes V–1 through V–6 is that of the line 5 and the phase of grid error signal which is obtained from the transformer rotors, is either the same as or opposite to the line 5 phase for the tubes V–1 through V–4. Thus, tubes V–1 and/or V–3 will be rendered conducting for angular displacement of one sense between the transformer rotors 18 and 19 and the transmitter rotors 6 and 10, and tubes V–2 and/or V–4 will be rendered conducting for angular displacements of the opposite sense.

For reasons hereinafter to become apparent, the connections to tubes V–1 and V–2 include a pair of unbypassed cathode resistances R–2 and R–3, and the connections to tubes V–3 and V–4 include a single unbypassed cathode resistance R–1 which is common to the cathode circuits of all four tubes. Also for reasons hereinafter to become apparent, cathode resistances R–2 and R–3 are selected equal and smaller than resistance R–1. R–2 and R–3 may be of the order of one-half the value of R–1.

Turning to the waveforms in Fig. 2, it will be seen that when the transformer rotors 18 and 19 are leading the transmitter rotors 6 and 10, the error signal (waveform 3) is assumed to be in phase with the plate supply voltage (waveform 2) provided by supply line 5 and transformer T–4. From waveforms 4 and 5 it will be seen that in this condition the error signal applied to the grids of tubes V–1 and V–3 by means of transformer T–1 and T–2 respectively is in phase with the line voltage (waveform 1) and that applied to the grids of tubes V–2 and V–4 is 180° out of phase with the line voltage. Consequently, since the circuit is a raw A. C. circuit the tubes can conduct only during the positive half cycles of the supply voltage as shown in waveform 2. Therefore, only tubes V–1 and V–3 are capable of conducting when the transformer rotors lead the transmitter rotors. Conversely, when the transformer rotors are lagging the transmitter rotors, the error signal (waveform 6) will be opposite in phase to the plate supply voltage. From waveforms 7 and 8 it follows that in this condition the error signals applied to tubes 2 and 4 (waveform 8) is in phase with the line voltage while that applied to tubes V–1 and V–3 is out of phase therewith. Consequently, in this case only tubes V–2 and V–4 are capable of conducting when the transformer rotors lag the transmitter rotors. In case there is zero error there will be no voltage induced in the transformer rotors and no signal applied through transformers T–1 or T–2. For this condition there will be only quiescent current through the tubes. The plate current in tubes V–1 and V–3 is carried by resistor R–4, in the same way the plate current through tubes V–2 and V–4 is carried by resistor R–5. For quiescent operation the current in each resistor is equal and equal signals are present on the control grids of tubes V–5 and V–6. If the upper tubes V–1 and/or V–3 begin to conduct more heavily than the lower tubes V–2 and/or V–4, the voltage at their plates will be dropped by resistor R–4 and the grid of tube V–5 will become more negative than the grid of tube V–6. In the same way more current through tubes V–2 and/or V–4 than in V–1 and V–3 will put a negative signal on the grid of tube V–6.

For quiescent operation the plate current in transformer T–3 from points E to D is equal and opposite to that from points E to F, thus they cancel and no energy is induced in the secondary. If either of tubes V–5 and V–6 conducts more heavily than the other an unbalance occurs between windings E and D and E and F of transformer T-3, producing an induced voltage in the secondary. The phase of this voltage will depend upon whether tube V-5 or tube V-6 is conducting and the magnitude of this voltage will depend upon the amount of conduction. The output from the first and second pairs of push-pull tubes V-1 through V-4 are connected to the grids of tubes V-5 and V-6 through a resistance capacitance smoothing network R-6, R-7 and C-1. The purpose of this smoothing network is to transform the pulsating output (due to the A. C. plate supply voltage) from the first and second pairs of push-pull type tubes V-1 through V-4 into a smooth direct voltage bias to tubes V-5 and V-6. Plate voltage for tubes V-5 and V-6 is obtained from tap C on transformer T-4 while the ground connection is taken at tap B.

The output of the final pair of tubes is connected through transformer T-3 to one field winding of the low inertia induction motor 23. Another field winding of this motor is physically placed at right angles to the first winding and is excited by the line 5 through the phase-shifting condenser C-2. Thus this winding is always 90° out of phase with the line 5 and hence also with the winding supplied by transformer T-3, the sense of this phase difference is controlled by the direction of current through the primary of transformer T-3 and determines the direction of rotation of the motor 23. If no signal is supplied by transformer T-3 there is no torque applied to the motor armature.

The curves drawn in Fig. 3, to which reference is now had, are taken to illustrate the relationship between the error voltage induced in the transformer rotors 18 and 19 and various angular displacements between the shafts 7 and 17. To this end, angular displacement between the shafts is plotted along the horizontal. The error voltages appearing above the horizontal axis are considered to be in phase with the line voltage 5, and those below the axis 180° out of phase therewith. Curve L illustrates the manner in which error voltage induced in the low speed rotor 19 varies with angular displacement between the shafts; and curve H illustrates the manner in which error voltage induced in the high speed rotor varies with angular displacement. It will be noted that the high speed rotor makes one revolution for every 10° rotation of the low speed rotor. It will be further noted that the error voltage obtainable from the high speed transformer rotor 18 is in phase with the line voltage 5 for error angles not greater than 5°, while that obtainable from the low speed rotor 19 is in phase with the line voltage 5 for error angles not greater than 180°. As long as the error signal stays within 5° the tendency is for tubes V-1 and V-3 to conduct with the result that the signal applied to tube V-5 is less than that supplied to V-6. This action causes the current applied to the rotor of the two phase motor 23 to be of such a phase as to reduce the error angle. If under any condition the error angle should exceed 5° but not 10° the phase of the error signal generated by the high and low speed transmitters would be in opposition. The high speed error signal would be of such a phase as to cause tube V-4 to conduct while the low speed error signal would cause tube V-1 to conduct. This relationship would normally cause whichever signal was the greatest in amplitude to take over and in case the high speed error signal predominated the correction would tend to be in the wrong direction. It is noted that resistor R-1 supplies the grid bias to tubes V-3 and V-4 and that resistors R-2 and R-3, separately in series with resistor R-1, supply the grid bias for tubes V-1 and V-2 respectively. By choosing resistor R-1 sufficiently larger than resistors R-2 and R-3, current through either tubes V-1 or V-2 caused by a 3 or 4 degree error will be enough to keep tubes V-3 and V-4 cut off for the largest signal the transformer T-2 can supply, thereby making the circuit insensitive to error signals from the high speed rotors for error angles greater than 3 or 4°. This prevents the system from locking in step at multiples of 10° error angle where the 36:1 ratio synchronous unit would indicate no misalignment.

Although I have shown and described only a certain and specific embodiment of the present invention it is to be understood that I am fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. A system for driving one or more rotary devices synchronously with a controlling device comprising, a pair of alternating current synchronous transmitter and transformer units interconnecting said rotary devices and said controlling device, the rotors of one of said units arranged to rotate a multiple number of times for each revolution of the rotary devices, and the rotors of the other of said units arranged to rotate once for each revolution of said rotary devices, an electronic control circuit, reversible motor means for rotating said rotary devices in response to said electronic control circuit, said electronic control circuit including first and second vacuum tube amplifier means connected respectively to the rotary device rotors of said one and said other of said units for amplifying the error signals produced therein, a cathode bias resistor for said first amplifier means connected to carry the cathode current of both amplifier means, and cathode bias resistor means for said second amplifier means connected to carry only the cathode current of said second amplifier means.

2. A system for driving one or more rotary devices synchronously with a controlling device comprising, a pair of alternating current synchronous transmitter and transformer units interconnecting said rotary devices and said controlling device, the rotors of one of said units arranged to rotate a multiple number of times for each revolution of the rotary devices, and the rotors of the other of said units arranged to rotate once for each revolution of said rotary devices, an electronic control circuit, reversible motor means for rotating said rotary devices in response to said electronic control circuit, said electronic control circuit including first and second vacuum tube amplifier means connected respectively to the rotary device rotors of said one and said other of said units, a source of plate supply for both said amplifier means, and an impedance means connected between said source and the cathodes of said first and second amplifier means, the control grid means of said first amplifier means being returned to the source end of said impedance means, the control grid means of said second amplifier means being returned to the cathode end of said impedance to negatively bias said first amplifier means in response to the energy flowing in said impedance.

3. A system for driving one or more rotary devices synchronously with a controlling device comprising, a pair of alternating current synchronous transmitter and transformer units interconnecting said rotary devices and said controlling device, the rotors of one of said units arranged to rotate a multiple number of times for each revolution of the rotary devices, and the rotors of the other of said units arranged to rotate once for each revolution of said rotary devices, motor means associated with said rotary devices, and an electronic control circuit coupling the transformer rotors of said units to said motor means, said control circuit comprising, a first pair of amplifiers excited in opposite phase from the rotor of the high speed transformer of said alternating current synchronous motor units, a second pair of amplifiers excited in opposite phase from the rotor of the low speed transformer of said alternating current synchronous motor units, resistance means interconnecting said first and second pair of amplifiers so that said first amplifier means is rendered inoperative when the angular displacement of said rotary devices and controlling device exceeds a predetermined value, and means connecting said first and second pair of amplifiers to said motor control means so as to control the direction and rotation of said motor means to maintain said rotary devices and said controlling device in synchronism.

4. A system for driving one or more rotary devices synchronously with a controlling device comprising, a pair of alternating current synchronous transmitter and transformer units interconnecting said rotary devices and said controlling device, the rotors of one of said units arranged to rotate a multiple number of times for each revolution of the rotary devices, and the rotors of the other of said units arranged to rotate once for each revolution of said rotary devices, motor means associated with said rotary devices, and an electronic control circuit coupling the transformer rotors of said units to said motor means, said control circuit comprising, a first pair of amplifiers excited in opposite phase from the rotor of the high speed transformer of said alternating current synchronous motor units, a second pair of amplifiers excited in opposite phase from the rotor of the low speed transformer of said alternating current synchronous motor units, resistance means in series with the cathodes of said first and second pair of amplifiers and providing bias for said first pair of amplifiers so that said first amplifier means is rendered inoperative when the angular displacement of said rotary devices and controlling device exceeds a predetermined value, and means connecting said first and second pair of amplifiers to said motor control means so as to control the direction and rotation of said motor means to maintain said rotary devices and said controlling device in synchronism.

5. A system for driving a controlled rotary device synchronously with a controlling rotary device comprising, a pair of synchronous transmitter and transformer units associated respectively with said controlling rotary device and said controlled rotary device, the rotors of one of said units arranged to rotate a multiple number of times for each revolution of said rotary devices, and the rotors of the other of said units arranged to rotate once for each revolution of said rotary devices, motor means associated with said controlled rotary device and arranged to rotate same in accordance with the sense and magnitude of an error signal applied thereto, and an electronic control circuit connecting the transformer rotors of said units to said motor means, said control circuit comprising a first pair of vacuum tube amplifier means which are driven in opposite phase from the rotor winding of one transformer of said units, a second pair of vacuum tube amplifier means connected in parallel with said first pair and driven in opposite phase from the rotor winding of the other transformer of said units, and a third pair of vacuum tube amplifiers driven in opposite phase by means of said first and second pair.

6. A system for driving one or more rotary devices synchronously with a controlling device comprising, a pair of alternating current synchronous transmitter and transformer units interconnecting said rotary devices and said controlling device, the rotors of one of said units arranged to rotate a multiple number of times for each revolution of the rotary devices, and the rotors of the other of said units arranged to rotate once for each revolution of said rotary devices, an electronic control circuit, reversible motor means for rotating said rotary devices in response to said electronic control circuit, said electronic control circuit including a first pair of amplifiers excited in opposite phase from the rotor of the high speed transformer of said alternating current synchronous motor units, a second pair of amplifiers excited in opposite phase from the rotor of the low speed transformer of said alternating current synchronous motor units, a source of plate supply for all of said amplifier means, a common resistance means connected between said source and the cathodes of all of said amplifier means, the grids of said first pair of amplifier means being returned to the source end of said common resistance means and the grids of said second pair of amplifier means being returned to the cathode end of said common resistance means.

References Cited in the file of this patent

UNITED STATES PATENTS

| Number | Name | Date |
| --- | --- | --- |
| 2,409,970 | Agins | Oct. 22, 1946 |
| 2,414,384 | Moseley | Jan. 14, 1947 |
| 2,424,569 | Moseley et al. | July 29, 1947 |
| 2,424,809 | Edwards | July 29, 1947 |
| 2,446,532 | Edwards | Aug. 10, 1948 |
| 2,493,772 | McCoy et al. | Jan. 10, 1950 |
| 2,528,486 | Dannatt et al. | Nov. 7, 1950 |
| 2,561,654 | Eller | July 24, 1951 |